United States Patent [19]

Henrick et al.

[11] 3,882,154

[45] May 6, 1975

[54] ESTERS OF 3,7,11 -TRIMETHYLDODECA-2,4,11-TRIENOIC ACID

[75] Inventors: Clive A. Henrick; John B. Siddall, both of Palo Alto, Calif.

[73] Assignee: Zoecon Corporation, Palo Alto, Calif.

[22] Filed: Nov. 9, 1972

[21] Appl. No.: 305,042

[52] U.S. Cl........... 260/410; 260/408; 260/410.9 R; 260/410.9 N; 260/413; 260/455 R; 260/502.6; 260/DIG. 44; 424/301; 424/312; 424/318; 424/DIG. 12
[51] Int. Cl...................... C07c 153/07; A01n 9/24
[58] Field of Search........ C07c/69/52; 260/410.9 R, 260/408, 410, 410.9 N, DIG. 44

[56] References Cited
UNITED STATES PATENTS
3,666,780   5/1972   Calame.............................. 260/405

FOREIGN PATENTS OR APPLICATIONS
2,115,673   10/1971   Germany
1,043,307   11/1958   Germany

*Primary Examiner*—Donald G. Daus
*Assistant Examiner*—Diana G. Rivers
*Attorney, Agent, or Firm*—Donald W. Erickson; Lee-Louise H. Priest

[57] ABSTRACT

Novel aliphatic hydrocarbon polyolefinic esters, synthesis thereof, useful for the control of insects.

7 Claims, No Drawings

ESTERS OF 3,7,11-TRIMETHYLDODECA-2,4,11-TRIENOIC ACID

This invention relates to novel esters, derivatives thereof, of the formula A:

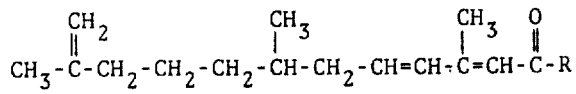

wherein,

R is one of the group —OR' or —SR', in which R' is hydrogen, lower alkyl, cycloalkyl, lower alkenyl or lower alkynyl.

the C-2,3 trans and cis isomers, the C-2,3 transisomer being the preferred embodiment for the control of insects.

The compounds of formula A are also useful for the preparation of other novel compounds, resulting from reactions on the olefinic bonds.

In the description following and hereinafter R is defined as hereinabove.

The compounds of the present invention are prepared according to the following outlined synthesis:

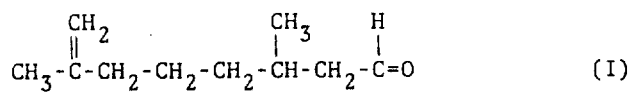

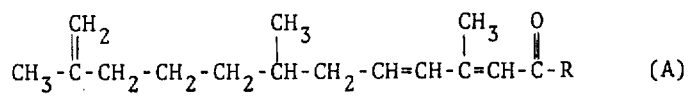

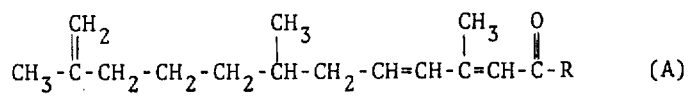

The compounds of formula A are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development leading to death or to inability to reproduce. These compounds are effective control agents for Heteropterans, such as Lygaeidae, Miridae and Pyrrhocoridae; Homopterans, such as Aphididae, Coccidae and Jassidae; Lepidopterans, such as Pyralidae, Noctuidae and Gelechiidae; Coleopterans, such as Tenebrionidae, Crysomelidae and Dermestidae; Dipterans, such as Culicidae, Muscidae and Sarcophagidae; and other insects. The compounds can be applied at low dosage levels of the order of 0.01 $\mu$g. to 10 $\mu$g. per insect. Suitable carrier substances include liquid or solid inert carriers, such as water, acetone, xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more compounds of formula A. Generally, a concentration of less than 25 percent of the active compound is employed. The formulations can include insect attractants, emulsifying agents or wetting agents to assist in the application and effectiveness of the active ingredient. In the application of the compounds, there is generally employed a mixture of The esters of formula A (R is —OR') are prepared by the reaction of the aldehyde of formula I with the carbanion of formula II to yield a compound of formula A.

The carbanion (II) is generated by treatment of the corresponding phosphonate with base, such as alkali metal hydride or alkali metal alkoxide, e.g., sodium hydride, sodium ethoxide or sodium methoxide, in organic solvent inert to the reaction, such as hydrocarbon, ether or dialkylsulfoxide solvent, e.g., benezene, toluene, dimethylformamide, tetrahydrofuran, and the like. The reaction is conducted at a temperature of from about −20°C to room temperature or above. The phosphonates can be prepared as described by Pattenden et al., *J. Chem. Soc.* (C), 1984 and 1997 (1968). The esters of formula A are converted into the corresponding acid by hydrolysis with base, such as potassium carbonate or sodium carbonate in organic solvent, such as methanol or ethanol. Other esters of the present invention can be prepared by transesterification or conversion of the acid into the acid halide by treatment with thionyl chloride, oxalyl chloride, or the like, and then reacting the acid halide with the alcohol corresponding to the ester moiety desired.

The thiolacid and thiolesters of formula A (R is —SR') are prepared from the acid chloride by reaction with hydrogen sulfide and alkylmercaptan or alkyl lead mercaptide, respectively.

The term "lower alkyl", as used herein, refers to a straight or branched chain saturated aliphatic hydrocarbon group having a chain length of one to six carbon atoms, e.g., methyl, ethyl, propyl, n-butyl, s-butyl, t-butyl, pentyl hexyl and i-propyl.

The term "cycloalkyl", as used herein, refers to a cyclic alkyl group containing three to eight carbon atoms, e.g., cyclopropyl, cyclopentyl and cyclohexyl.

The term "lower alkenyl", as used herein, refers to an ethylenically unsaturated hydrocarbon group, branched or straight chain, having a chain length of two to six carbon atoms, e.g., allyl, vinyl, 3-butenyl, 2-hexenyl and i-propenyl.

The term "lower alkynyl", as used herein, refers to an acetylenically unsaturated hydrocarbon group, branched or straight chain, having a chain length of three to six carbon atoms, e.g., 3-butynyl, 2-propynyl and 3-pentynyl.

The presence of a double bond at position C-2 and C-4 of the compound of formula A gives rise to four isomers, each of which is embraced by the present invention. As mentioned above, a mixture of isomers is suitably employed for the control of insects, such as a mixture containing the trans(2), trans(4) isomer and the cis(2), trans(4) isomer. The conditions of the synthesis described herein and the reactants can be selected so as to favor formation of one isomer, such as the all trans isomer, over the formation of other isomers. The selection of appropriate conditions and reactants to favor formation of one isomer over another will be apparent to those of ordinary skill in the art. In the specific examples hereinafter, when isomerism is not specified, it is understood to include a mixture of isomers which, if desired, can be separated using known separation methods, such as chromatography or fractional distillation.

The following examples are provided to illustrate the present invention. Temperature is given in degrees Centigrade.

EXAMPLE 1

To a mixture of 1 g. of 3,7-dimethyl-7-octen-1-al (I) and 1.5 g. of phosphonate (II: R' is ethyl, R is ethoxy) and 50 ml. of dimethylformamide, under nitrogen, is slowly added sodium ethoxide (prepared from 200 mg. of sodium and 12 ml. ethanol). The mixture is allowed to stand at room temperature for 1 hour, poured into water and extracted with ether. The ethereal extracts are dried, concentrated and then chromatographed on silica plates eluting with hexane/ether (5 percent ether) to yield ethyl 3,7,11-trimethyldodeca-2,4,11-trienoate, which is predominantly trans at position C-2,3 and C-2,4.

EXAMPLE 2

A mixture of 1 g. of ethyl 3,7,11-trimethyldodeca-2,4,11-trienoate, 60 ml. of methanol, 0.5 g. of sodium hydroxide and 6 ml. of water is stirred at about 30° for about 56 hours. The mixture is then diluted with water, acidified and extracted with ether. The organic phase is washed with water, dried over sodium sulfate and evaporated to yield 3,7,11-trimethyldodeca-2,4,11-trienoic acid.

EXAMPLE 3

One gram of thionyl chloride is added with stirring at room temperature to 0.5 g. of 3,7,11-trimethyldodeca-2,4,11-trienoic acid in 50 ml. of ether and the mixture heated at about 50° for 20 minutes. Excess thionyl chloride and solvent is removed by evaporation and then fresh ether and cyclopropyl alcohol (about 2 equivalents) is added and the mixture allowed to stand 2 hours at room temperature. Excess cyclopropyl alcohol and solvent is removed by evaporation to yield cyclopropyl 3,7,11-trimethyldodeca-2,4,11-trienoate, which is purified by chromatography.

Similarly, by using other alcohols, such as s-butanol, t-butanol, i-propanol, i-butanol, n-propanol, allyl alcohol or 3-pentynyl alcohol in the foregoing procedure, the corresponding esters are obtained.

EXAMPLE 4

One gram of 3,7,11-trimethyldodeca-2,4,11-trienoic acid in 30 ml. of benzene and 1 equivalent of sodium hydride is stirred about two hours and then a slight excess of oxalyl chloride is added at about 0° and stirred for 1 hour. The product is worked up by removal of solvent in vacuo and extraction with pentane to yield 3,7,11-trimethyldodeca-2,4,11-trienoyl chloride.

EXAMPLE 5

To a solution of 12.7 g. of 3,7,11-trimethyldodeca-2,4,11-trienoyl chloride in ether is added 6.2 g. of ethyl mercaptan and 5.9 g. of pyridine at −40°. The mixture is allowed to stand at 0° for about 3 hours and then is diluted with ether and water and separated. The ether phase is washed with dilute aqueous sodium hydroxide, dilute hydrochloric acid and then water, dried and the solvent removed to yield ethyl 3,7,11-trimethylthiododeca-2,4,11-trienoate.

Similarly, by using other mercaptans, such as methyl mercaptan, cyclohexyl mercaptan, i-propyl mercaptan, allyl mercaptan or 3-butynyl mercaptan, the corresponding esters are obtained.

EXAMPLE 6

3,7,11-Trimethyldodeca-2,4,11-trienoyl chloride (17 g.) is added slowly to ethyl lead mercaptide (13.4 g.) covered with ether. The mixture is allowed to stand overnight and then is filtered. The filtrate is evaporated under reduced pressure to yield ethyl 3,7,11-trimethylthioltrideca-2,4,11-trienoate, which can be purified by chromatography.

EXAMPLE 7

To 25 g. of 3,7,11-trimethyldodeca-2,4,11-trienoyl chloride in ether is added an excess of pyridine saturated with hydrogen sulfide at −40° and the mixture is allowed to stand in a sealed vessel at 0° for about 2 hours and then is diluted with water, neutralized and extracted with ether. The organic phase is washed with water, dried over sodium sulfate and evaporated to yield 3,7,11-trimethylthiododeca-2,4,11-trienoic acid.

EXAMPLE 8

Propargyl alcohol is reacted with 3,7,11-trimethyldodeca-2,4,11-trienoyl chloride using the process of Example 3 to yield prop-2-yn-1-yl 3,7,11-trimethyldodeca-2,4,11-trienoate.

EXAMPLE 9

To dry NaHS (2.8 g.) in 40 ml. of dry dimethylformamide, cooled in ice bath, is added 6.3 g. of 3,7,11-trimethyldodeca-2,4,11-trienoyl chloride, under nitrogen. The reaction is warmed to room temperature and stirred for 1.5 hours. The reaction is then poured into water. To the mixture is added about 100 ml. of ether/ hexane (1:1) and 10 percent NaOH and the neutral impurities extracted into the organic layer. The aqueous layer is acidified with 10 percent sulfuric acid solution and extracted 3X with ether/hexane. The combined organic layers are washed with water until neutral and with brine and dried over calcium sulfate. After filtering, solvents are evaporated leaving 3,7,11-trimethylthiododeca-2,4,11-trienoic acid.

To a mixture of 3.5 g of the thioacid, 4.0 g. of prop-2-yn-1-yl chloride, 14 ml. of ether and 28 ml. of dimethylformamide, cooled to 5°, is added 6.3 ml. of 2,4-lutidine. The reaction is then worked up by pouring into water and extracting 3X with ether. The combined organic layers are washed with 2N sulfuric acid, aqueous sodium bicarbonate, water until neutral, 10 percent $CuSO_4$ solution, water and brine and then dried over calcium sulfate and solvent evaporated to yield prop-2'-yn-1'-yl 3,7,11-trimethylthiododeca-2,4,11-trienoate, which is purified by preparative thin-layer chromatography.

EXAMPLE 10

Into a flask equipped with an addition funnel, stirrer, thermometer and condenser is placed 32.1 g. of 50 percent aqueous NaOH and 200 ml. of ether. To this mixture is added 30.5 ml. of 97 percent ethanethiol in 10 ml. of ether. After addition is complete, the reaction is allowed to cool to ambient temperature, and to it is added, under nitrogen, a solution of 0.40 m. of 3,7,11-trimethyldodeca-2,4,11-trienoyl chloride in 100 ml. of ether. The reaction is stirred one hour at ambient temperature and then washed with 100 ml. of 2N NaOH, 100 ml. of water and 100 ml. of brine. After drying over sodium sulfate, solvent is evaporated at reduced pressure to yield ethyl 3,7,11-trimethylthioldodeca-2,4,11-trienoate.

What is claimed is:

1. A compound selected from those of the following formula:

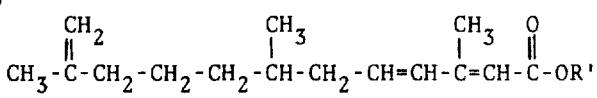

wherein, R' is lower alkyl, cycloalkyl of three to eight carbon atoms, or lower alkynyl.

2. A compound according to claim 1, wherein R' is lower alkyl.

3. A compound according to claim 1 wherein R' is lower alkynyl.

4. The compound, ethyl 3,7,11-trimethyldodeca-2,4,11-trienoate, according to claim 1.

5. The compound, prop-2-yn-1-yl 3,7,11-trimethyldodeca-2,4,11-trienoate, according to claim 3.

6. The trans,trans isomer of the compound of claim 4.

7. A compound according to claim 1 wherein R' is cyclopropyl.

* * * * *